Patented Nov. 3, 1953

2,657,995

UNITED STATES PATENT OFFICE 2,657,995

PROCESS FOR PREPARING HARD BUTTER FROM HYDROGENATED COCONUT OIL AND SIMILAR OILS

John E. Blum, El Cerrito, Calif., assignor to The Glidden Company, Cleveland, Ohio, a corporation of Ohio No Drawing. Application November 29, 1949, Serial No. 130,085

8 Claims. (Cl. 99—118)

1

This invention relates to a process for producing hard butter and like products from hydrogenated coconut oil or from other hydrogenated oils of the coconut oil group.

Hard butter is a glyceride fat which is widely marketed commercially for use in confectionery and various other edible products. Within recent years some efforts have been directed to the production of hard butter by synthesizing it, whereas hard butter was formerly derived from natural glyceride oils and fats. Whether synthetic or natural, the hard butter must have certain well defined characteristics in order to meet the requirements of the trade. It should melt rapidly and completely at body temperature, should have a "sharp" or narrow melting range, should preferably have the quality of breaking sharply and suddenly at 70° F. and thereabove (snap), should be free of a waxy taste or feel in the mouth, and should be relatively free of low-melting components which "sweat" or bleed out of the hard butter when it stands at room and higher temperatures. In addition it should, of course, be of edible quality, free from objectionable flavors or odors, and should be light in color.

Hard butter has long been prepared from coconut oil by a "graining" process in which the heated oil is slowly cooled to induce crystallization of the higher-melting components and then pressing the grained mixture to squeeze the liquids away from the crystallized material. The "graining" process has numerous disadvantages which are well recognized in the art, and improved methods for producing hard butter have long been sought. Hard butter prepared from coconut oil by the graining process yet accounts for a portion of present-day production, but other natural oils such as palm-kernel and tucum oil, because of their more nearly suitable natural properties, give large yields of hard butter and are nowadays the principal sources of hard butter. These oils are, however, available in only restricted quantities and for only short periods of time during each year, so that substantially a whole year's supply must be purchased during the short buying season, with the result that highly competitive buying and unstable pricing occur. These factors plus the storage and large inventory costs motivate the use of the more readily available coconut oil as a source of hard butter instead of other natural oils such as palmkernel and tucum oil.

I have now found that hydrogenated coconut oil may be fractionated under high-vacuum conditions to yield various fractions or cuts which

2 meet the requirements for hard butter. I have also found that by "topping" the hydrogenated coconut oils to a predetermined extent, a residue which meets the trade requirements of hard butter may be produced. Moreover, the hydrogenated coconut oil is not decomposed appreciably under my fractionating or "topping" conditions so that the various fractions and/or residues not suitable for hard butter remain as edible glycerides which are suitable for other uses in foods and industry. Furthermore, the losses involved in the distillations are quite low. All of these factors unite in keeping my processing costs sufficiently low to render the process eminently satisfactory for commercial use.

Accordingly it is an object of this invention to fractionally distill hydrogenated coconut oil under high-vacuum conditions.

It is a further object to secure distilled fractions and/or residues of hydrogenated coconut oil suitable for use as hard butter.

Yet another object is to similarly treat other hydrogenated oils of the coconut oil group, e. g., hydrogenated palm-kernel, tucum, murumuru, babassu, etc.

A further object is to distill natural coconut oil into fractions and/or residues which when hydrogenated are suitable for use as hard butters and similar edible products.

A further object is to blend various fractions and/or residues derived from such distillation treatments into mixtures of glycerides suitable for a wide variety of uses in addition to the use thereof as hard butter.

These and other objects will be apparent from the following description of the invention and of some of its modifications and ramifications.

Coconut oil [1] is composed of various triglycerides of the following fatty acids:

| Fatty acid: | Per cent |
|---|---|
| Linoleic | 2.6 |
| Capric | 7.2 |
| Caprylic | 7.9 |
| Caproic | (0.5) |
| Lauric | 48.0 |
| Myristic | 17.5 |
| Palmitic | 9.0 |
| Stearic | 2.1 |
| Oleic | 5.7 |

Hydrogenation modifies this distribution only by eliminating the linoleic and oleic, and converting them essentially to stearic acid, making this acid

[1] From "The Constitution of Natural Fats" by Hilditch.

amount to about 10.4% of the fatty acids in the oil. Hydrogenated tucum and hydrogenated palm-kernel oil contain larger percentages of stearic acid. I have found that these hydrogenated oils can be fractionally distilled under high-vacuum conditions of pressure below 1 millimeter of mercury, and especially at pressures below about 0.5 millimeter of mercury. Under these conditions the glycerides containing caproic, capric and caprylic acids can be removed, so as to leave residues composed largely of glycerides containing lauric, myristic, palmitic and stearic acids. By further distillation, substantial quantities of glycerides containing lauric and myristic acids can be removed. I do not mean to indicate that the glycerides of these particularly named acids can be wholly removed from the coconut oil in a stepwise manner, but merely that the various glyceride fractions which are removed show gradual increases in their contents of the progressively higher fatty acids. Accordingly, it is possible to distill until a first fraction, representing a predetermined percentage of the whole oil, has been removed. This fraction may then be set apart, and a second fraction containing more of the higher fatty acids may be collected and set apart. Third and further fractions may be similarly removed. The physical properties of these various fractions will show progressive changes; that is, the melting point rises progressively, the melting range becomes narrower than that of the oil and the saponification number becomes progressively smaller. I have determined that by suitably limiting the fractions on a percentage basis, one or more fractions may be recovered which are particularly suited for use as hard butter. The following example will illustrate this feature.

EXAMPLE 1

A batch of coconut oil was hydrogenated to an iodine number of about 0.1, and was then introduced into a vacuum still where it was distilled to produce 10 cuts or fractions and a residue. The vacuum during distillation was between .1 mm. and .5 mm., and the temperature ranged from 65° C. to 334° C.

10 were not darker than 20 Y, 2.0 R. The residue was dark but was found to be readily bleachable. It will be seen that by distilling off 77.87 percent of the oil (Cuts 1–7, incl.) and setting these apart, the collection of the next 18.65 percent of the oil (Cuts 8–10, incl.) gives material suitable for use as hard butter.

EXAMPLE 2

A batch of hydrogenated coconut oil was distilled under a vacuum below .5 mm. to produce a distillate amounting to about 60% of the original batch, and a residue of about 40%. The oil did not need to be heated over 315° C. to effect this fractionation, and the lower temperature substantially avoided darkening of the residue. The residue had a refractive index (48° C.) of 32.7, a setting point of 36.0° C., a "sweating" point of 30.5° C., and was satisfactory for use as hard butter. The following table compares various residues of higher and lower percentage, obtained in other analogous tests.

| Percent of original | Residues | | | | |
|---|---|---|---|---|---|
| | R. I. (48° C.) | Setting point, °C. | Sweat point, °C. | Cap. melting point, °C. | Suitability [1] as hard butter |
| 41.9 | 33.2 | 33.4 | 29.7 | | Poor. |
| 37.6 | 33.3 | 34.4 | 32.0 | | Satisfactory. |
| 34.4 | 33.7 | 34.2 | 31.3 | | Do. |
| 34.6 | 32.7 | 36.5 | 33.5 | | Do. |
| 29.2 | 33.0 | 37.0 | 31.4 | 48 | Do. |
| 21.5 | 33.4 | 40.8 | | 52 | Poor, waxy. |

[1] This is based upon the physical characteristics of the oil as well as on eating qualities. The first example (41.9%) was quite suitable for a low-melting hard butter such as was produced by pressing coconut oil. The last example was waxy in the mouth but would have merit in geographical regions of high temperatures.

The residues which comprise from 30% to 40% of the original will be seen to have setting and sweat points which make them useful as general hard butters. It will be noted that the residues provide a higher yield of product than do the separated fractions 8–10, inclusive, of Example 1.

I have found that coconut oil decomposes only slowly under the high-vacuum distillation conditions in the absence of rearrangement or decom-

| Cut | Pressure (mm. of Hg) | Distillate temp., °C. | Weight, percent | Sap. No. | F. F. A., percent | Setting point | Wiley melting point | Suitability for hard butter |
|---|---|---|---|---|---|---|---|---|
| 1 | .1 –.3 | 65–273 | 11.81 | 268.7 | 3.6 | | | |
| 2 | .2 –.4 | 275–278 | 11.13 | 270.5 | 2.1 | | | |
| 3 | .2 –.4 | 279–280 | 11.09 | 268.4 | 2.4 | | | |
| 4 | .2 –.4 | 279–280 | 12.11 | 264.9 | 3.4 | | | |
| 5 | .2 –.4 | 279–281 | 11.67 | 261.3 | 2.8 | | | |
| 6 | .2 –.4 | 281–286 | 10.48 | 256.5 | 3.3 | 25.4 | 27.4 | Low melting point. |
| 7 | .25–.4 | 286–295 | 9.58 | 249.6 | 2.8 | 27.5 | 29.9 | Do. |
| 8 | .3 –.4 | 294–299 | 7.19 | 243.0 | 3.0 | 30.6 | 33.0 | Fair. |
| 9 | .35–.5 | 297–306 | 6.42 | 233.8 | 3.6 | 34.0 | 36.7 | Good. |
| 10 | .35–.4 | 307–310 | 5.04 | 222.8 | 4.6 | 37.0 | 41.9 | Fair. |
| Residue | | (¹) | 3.48 | 204.9 | 0.1 | 47.8 | 52.4 | |

¹ Temperature of residue at end of run was 334.4° C.

The example indicates that control of fractions cannot be accomplished satisfactorily by controlling the distilling temperature, and is best controlled on a percentage basis. Fraction 9 yielded a good hard butter. Fraction 8 was slightly low in melting point and Fraction 10 was slightly high in melting point, but a satisfactory hard butter was produced by blending these fractions. Fractions up to No. 7, inclusive, were colorless to pale yellow, while Fractions 8, 9 and position catalysts. The following example illustrates the stability of the oil.

EXAMPLE 3

Different 3000 gram batches of coconut[2] oil were refluxed for varying lengths of time, and the

[2] Coconut oil was used rather than hydrogenated coconut oil because of its greater sensitivity to heat and oxidation. Coconut oil has been found to have similar behavior to hydrogenated coconut oil under conditions of high heat and high vacuum.

distillate and residue fractions were analyzed for decomposition. Batches A and B were without added catalyst, while batches C and D were in contact with iron wire.

| Batch | A | B | C | D | Original |
|---|---|---|---|---|---|
| Average temperature, °F | 570 | 570 | 570 | 570 | |
| Duration (hours) | 1 | 4 | 1 | 4 | |
| Average vacuum, mm | 0.07 | 0.09 | 0.10 | 0.13 | |
| Color | 8Y, 1.2R | 8Y, 1.5R | 30Y, 5.6R | Red | 7Y, 1.1R. |
| F. F. A., percent | 0.35 | 0.40 | 0.30 | 0.40 | |
| R. I. (48° C.) | 31.0 | 31.0 | 31.0 | 31.3 | 31.0. |
| Wiley melting point, °C | 25.0 | 26.5 | 25.3 | 27.4 | |
| Distillate wt., gm | 1.0 | 5.5 | 2.0 | 5.5 | |
| F. A. in residue (calc.), gm | 1.5 | 6.7 | 2.9 | 6.7 | |
| Percent decomposition | 0.7 | 2.1 | 0.8 | 2.1 | |

It will be seen that the oil is decomposed and rearranged slowly proportionately to length of treatment. It will also be seen that the iron wire of batches C and D caused much darkening of the oil without substantially increasing the decomposition. Under comparable treatment, batches to which were added such rearrangement catalysts as SnCl₂, NaHCO₃ or KOH were darkened excessively and exhibited substantial decomposition. The darkened materials were more difficult to bleach. Under the conditions of these experiments, the foregoing rearrangement catalysts do not appear to be desirable. The avoidance of iron or other reactive equipment is desirable. Stainless steel, nickel, glass equipment or equipment made from other non-reactive materials are satisfactory.

I have redistilled a 70% distillate cut of hydrogenated coconut oil but have found that such double distillation offers no commercial advantage so far as the preparation of hard butter is concerned.

Other oils of the coconut-oil group can be treated in manners analogous to those described hereabove. The following Examples 4 and 5 illustrate the changes which can be secured in the properties of hydrogenated palm-kernel and/or hydrogenated tucum in comparison with hydrogenated coconut oil and the general similarity of action of oils of this group.

EXAMPLE 4

Equal batches of hydrogenated coconut oil, hydrogenated palm-kernel oil and hydrogenated tucum oil were distilled at pressures below 1.0 mm. to produce four distillate fractions and a residue. The various properties of the original oils, of the distillate fractions, and of the residues are shown in the following table:

| Oil | F. F. A. | R. I., 48° C. | Wiley melting point, °C | Setting point, °C | Sap. No. | Suitability¹ as hard butter |
|---|---|---|---|---|---|---|
| Coconut: | | | | | | |
| Original | 0.1 | 30.6 | 38.7 | 29.0 | 254 | |
| Cut 1, 21.2% | 2.2 | 28.9 | 25.8 | 20.1 | 265 | |
| Cut 2, 24.2% | 1.2 | 29.5 | 29.5 | 23.0 | 263 | |
| Cut 3, 21.6% | 1.0 | 30.0 | 30.9 | 25.3 | 258 | |
| Cut 4, 16.4% | 1.1 | 30.9 | 34.0 | 28.4 | 250 | O. K. |
| Residue 16.2% | .1 | 33.8 | 48.5 | 42.0 | 227 | |
| Palm-kernel: | | | | | | |
| Original | .2 | 31.9 | 42.9 | 33.9 | 244 | |
| Cut 1, 21.2% | 3.7 | 29.3 | 26.3 | 22.6 | 259 | |
| Cut 2, 21.4% | 1.7 | 30.3 | 30.3 | 26.6 | 256 | |
| Cut 3, 21.2% | 1.4 | 31.2 | 33.8 | 30.4 | 248 | O. K. |
| Cut 4, 19.8% | 2.5 | 32.5 | 37.7 | 34.1 | 236 | O. K. |
| Residue 16.2% | .1 | 36.6 | 52.5 | 47.8 | 210 | |
| Tucum: | | | | | | |
| Original | .6 | 31.7 | 42.5 | 34.3 | 242 | |
| Cut 1, 23.4% | 5.7 | 29.5 | 28.5 | 25.4 | 255 | |
| Cut 2, 21.0% | 1.4 | 30.7 | 33.1 | 28.7 | 251 | O. K. |
| Cut 3, 16.1% | 1.2 | 31.2 | 34.5 | 30.9 | 247 | O. K. |
| Cut 4, 16.7% | 1.3 | 31.8 | 36.1 | 33.2 | 242 | O. K. |
| Residue 22.7% | .1 | 34.5 | 50.1 | 44.8 | 222 | |

¹ Based upon physical characteristics of the oil as well as eating qualities. The percentages indicated are illustrative of the product produced but can be varied somewhat while still producing suitable hard butter products. This is apparent by comparing the two sets of data on coconut oil.

It will be seen that with hydrogenated palm-kernel and tucum oils, certain distillate fractions are suitable for use as hard butter, and it will also be seen that such fractions are a larger percentage of the original oil than was the case with hydrogenated coconut oil.

EXAMPLE 5

In this example, the properties of residues remaining after "topping" hydrogenated palm-kernel oil various amounts are shown.

| Residue; percent of orig. | Distillate percent free F. A. | R. I., 48° C. | Setting point, °C. | Dropping point, °C. | Sweat point, °C. | Capillary melting point, °C. |
|---|---|---|---|---|---|---|
| Orig. oil | | 31.6 | 35.2 | 44.2 | 30.5 | 47.0 |
| 1. 79.9% | 8.0 | 32.2 | 37.5 | 45.3 | 34.0 | 48.0 |
| 2. 73.3% | 11.4 | 32.5 | 37.4 | 44.9 | 35.0 | 47.5 |
| 3. 92.1% | 18.0 | 31.8 | 36.2 | 43.8 | 34.0 | 46.6 |

It will be seen here that the sweat point of hydrogenated palm-kernel oil can be raised appreciably by distilling off about 8% of the original oil, although smaller quantities would show improvements. It will also be seen that the resulting residues are suitable for use as hard butter, and amount to a much larger percentage of the original oil than do the suitable residues of hydrogenated coconut oil. The relatively large percentages of free fatty acids in the distillates indicate that more decomposition of this oil occurs than is noticed when hydrogenated coconut oil is distilled, and in the case of sample 3, some acid interchange obviously took place. This was due to poor vacuum of about 1 mm. Example 4 shows considerably less decomposition. These side reactions notwithstanding, it will be clear from this example that hydrogenated palm-kernel oil (palm-kernel hard butter) can be improved by distilling off small portions of the oil. In a like manner tucum or other coconut type oils may be improved by "topping" as was indicated in Example 3.

Molecular distillation conditions are very suitable for commercial practice of this invention. I have found that when coconut oil is distilled under such conditions (about 5 microns pressure) a 50% or 60% distillate fraction can be removed in a single pass at a rate of at least 2 gallons per hour when treated in a 14" centrifugal still. In fact, a 90% distillate fraction could easily be removed under substantially these conditions of pressure and rate of flow.

The residue fractions of this type of distillation have characteristics as follows:

| Sample | Percent of original | Color | Percent F.F.A. | Sap. No. | Iodine value |
|---|---|---|---|---|---|
| 1, distillate | 60.2 | 1.5Y, 4R | 0.03 | 267 | 3.5 |
| 1, residue | 39.8 | 19Y, 30R | .015 | 237 | 20.9 |
| 2, distillate | 52.3 | 3Y, 5R | .04 | 262 | 3.9 |
| 2, residue | 47.7 | 35Y, 37R | .02 | 243 | 17.2 |

These residues may then be hydrogenated to make a suitable hard butter as in the following example:

EXAMPLE 6

Portions of #1 and #2 residue were each fully hydrogenated by conventional hydrogenation procedures. The conditions used were: hydrogen gas at a 15-pound pressure, hydrogenation temperature 350° F., nickel catalyst in concentrations of 0.25% and rapid agitation. The analyses of these samples were as follows:

|  | R.I. 43° C. | Sap. No. | Setting point, °C. | Wiley melting point, °C. | Iodine value | Sweat point °C. | Suitability[1] for hard butter |
|---|---|---|---|---|---|---|---|
| Residue 1, hydrogenated. | 32.4 | 235 | 38.1 | 46.9 | 0.2 | 31.5 | Good. |
| Residue 2, hydrogenated. | 31.9 | 241 | 36.1 | 44.5 | .2 | 33.5 | Do. |

[1] These tests were based upon the physical characteristics of the product as well as eating qualities.

As can be seen from this example, hard butters can be made from unhydrogenated coconut oil that has been distilled and then hydrogenated. This variation is less preferable as the product cannot be evaluated directly and the product is also more susceptible to oxidation than the completely hydrogenated oil. The quality of the end product is more difficult to control when the hydrogenation step follows the distillation. This example shows that the exact order of the steps is not inflexible but indicates that distillation of the already hydrogenated oils is preferred.

Stripping steam may be used to assist distillations carried out at pressures below 1 mm., and its use reduces the color of the residue. The following example compares the results obtained with and without stripping steam. Other inert or nonreactive gases such as nitrogen could be used.

EXAMPLE 7

Two different 200 ml. batches E and F of hydrogenated coconut oil having a color of 9Y, 0.9R were distilled at temperatures between 530° F. and 598° F. for 20 minutes at pressures of .3 mm. to produce a 60% distillate fraction and a 40% residue of each batch. Stripping steam was used to assist the distillation of batch F. The following table compares the results:

| Batch |  | Wiley melting point, °C. | Setting point, °C. | Sweat point, °C. | R.I. 48° C. | Sap. No. | I No. | F.F.A., percent | Color |
|---|---|---|---|---|---|---|---|---|---|
| E | Distillate | 30.1 | 23.3 |  | 29.3 | 262 | 0.6 | 1.6 | 22Y, 2.2R |
| E | Residue | 43.4 | 35.1 | 32.5 | 32.1 | 241 | .7 |  | 100Y, 16.0R |
| F | Distillate | 22.7 | 21.0 |  | 29.1 | 264 | .8 | 3.2 | 1Y, 0.2R |
| F | Residue | 44.7 | 36.4 | 33.5 | 32.6 | 235 | .7 |  | 75Y, 7.6R |

It will be noted that the use of stripping steam improved the color of both the distillate and the residue of batch F as compared with batch E, but that the free fatty acids were higher in batch F than in batch E, due probably to hydrolysis of the glycerides in the presence of steam.

In the foregoing description of the invention, I have pointed out that individual oils of the coconut oil group, after being hydrogenated, may be distilled to produce fractions or residues which are suitable for use as hard butters. The invention, however, is not restricted to the treatment of the individual oils. Various oils of the coconut oil group may be blended together before being hydrogenated and/or distilled, the distillation then being conducted so as to produce either selected fractions or residues suitable for hard butter. Furthermore, it will be understood that selected fractions and/or residues derived from the various individual oils may be blended with fractions and/or residues of other oils of the coconut oil group, so as to produce blended products which are suitable for use as hard buters, analogous edible butters, or various other edible products.

The distillates obtained from my treatment of the hydrogenated oils of the coconut oil group are, as indicated, light colored fluid glyceride oils which may be used for a variety of purposes in foods or in industry. I have found that the 60% distillate fraction of Example 2 is very well suited for use as a corn-popping oil and will not gum kettles as much as more unsaturated oils. The distillates may be used in other cooking oils, in baked goods, confections, sauces, low melting coatings for frozen food products, dressings, etc. Numerous industrial uses will also be evident to those skilled in the art.

My process accordingly makes it possible to separate hydrogenated or natural oils of the coconut oil group into numerous products, and to so control the physical properties of the resulting products as to, in many cases, "tailor-make" a glyceride material for specific uses. This flexibility of the fractionation process obviously offers many commercial advantages over other methods of the prior art.

Having now described my invention, what I claim is:

1. A process for preparing hard butter from oil of the coconut oil group, said process comprising the following steps in which steps (1) and (2) may be taken in any order ahead of step (3): (1) by vacuum distillation at a pressure below about one millimeter of mercury, removing from a mass of oil composed of at least one oil of the coconut oil group an initial distillate composed essentially of fatty glycerides until the remaining residue has a saponification number between about 229 and 241 when substantially free of unsaturation in the fatty acid radicals of the glycerides thereof; (2) by hydrogenation, substantially eliminating unsaturation from the fatty acid radicals of at least the glycerides in said residue; and (3) preparing hard butter from at least a portion of the substantially unsaturation-free residue.

2. The process as claimed in claim 1 wherein hydrogenation precedes vacuum distillation and substantially eliminates unsaturation in the fatty acid radicals of all of the glycerides in said oil.

3. The process as claimed in claim 2 wherein the oil being distilled consists of hydrogenated palm kernel oil, wherein the initial distillate amounts to between about 8% and 27% of the original oil, and wherein hard butter is prepared from all of the residue.

4. The process as claimed in claim 2 wherein the oil being distilled is hydrogenated coconut oil, wherein the initial distillate amounts to at least about 50% of the original oil, and wherein hard butter is prepared from all of the resulting residue.

5. The process as claimed in claim 1 wherein vacuum distillation precedes hydrogenation, and hydrogenation is applied only to the residue.

6. The process as claimed in claim 1 wherein said vacuum distillation is conducted in the presence of introduced inert gas.

7. The process as claimed in claim 6 wherein the oil being treated is coconut oil, wherein the initial distillate amounts to about 50% of the original oil, and wherein hard butter is prepared from all of the substantially unsaturation-free residue.

8. The process as claimed in claim 6 wherein the oil being treated is palm-kernel oil, wherein the initial distillate amounts to between about 8% and 27% of the original oil, and wherein hard butter is prepared from all of the substantially unsaturation-free residue.

JOHN E. BLUM.

References Cited in the file of this patent

UNITED STATES PATENTS

| Number | Name | Date |
| --- | --- | --- |
| 2,126,466 | Hickman | Aug. 9, 1938 |
| 2,296,457 | Schutte | Sept. 22, 1942 |

OTHER REFERENCES

"High-Vacuum Short-Path Distillation." A Review by K. C. D. Hickman, Reprinted from Chemical Reviews, vol. 34, No. 1, February 1944, pages 84–106.

"The Use of Molecular Distillation in the Field of Fats. I. The Distillation of Fat Acids and the Refining of Fat." H. P. Kaufman and W. Wolf. Fette u. Seifen 47, 252–61 (1940), Chemical Abstracts, vol. 35, 4981.